United States Patent [19]
Oda et al.

[11] Patent Number: 5,828,584
[45] Date of Patent: Oct. 27, 1998

[54] DEVICE FOR DETERMINING A DISTANCE RANGE OF AN OBJECT

[75] Inventors: Hajime Oda; Takuma Takahashi; Shinichi Endo, all of Yotsukaido, Japan

[73] Assignee: Seiko Precision Inc., Japan

[21] Appl. No.: 574,125

[22] Filed: Dec. 18, 1995

[30] Foreign Application Priority Data

Dec. 19, 1994 [JP] Japan ..................................... 6-314626
Jan. 10, 1995 [JP] Japan ..................................... 7-001938

[51] Int. Cl.⁶ ............................... G01C 3/00; G02B 7/04
[52] U.S. Cl. ......................... 364/561; 354/403; 356/3.11
[58] Field of Search ................................... 364/561, 562, 364/458, 569; 354/402–403, 408, 414, 421; 356/3.01, 3.11

[56] References Cited

U.S. PATENT DOCUMENTS

| | | | |
|---|---|---|---|
| 4,125,835 | 11/1978 | Barry .................................... | 343/13 R |
| 4,535,415 | 8/1985 | Hird ........................................ | 364/561 |
| 4,582,424 | 4/1986 | Kawabata ............................... | 354/403 |
| 4,941,009 | 7/1990 | Yoshida .................................. | 354/402 |
| 5,049,887 | 9/1991 | Henning et al. ........................ | 342/110 |
| 5,099,266 | 3/1992 | Nakajima et al. ...................... | 354/403 |
| 5,163,323 | 11/1992 | Davidson ................................ | 73/290 |
| 5,172,155 | 12/1992 | Kosaka ................................... | 354/403 |
| 5,353,228 | 10/1994 | Geiss et al. ............................. | 364/561 |
| 5,485,262 | 1/1996 | Tsunemiya et al. .................... | 354/403 |

FOREIGN PATENT DOCUMENTS

| | | |
|---|---|---|
| 1311337 | 3/1973 | United Kingdom . |
| 2220814 | 1/1990 | United Kingdom . |
| 2247534 | 3/1992 | United Kingdom . |
| 1605369 | 6/1994 | United Kingdom . |

*Primary Examiner*—Emanuel T. Voeltz
*Assistant Examiner*—Bryan Bui
*Attorney, Agent, or Firm*—Adams & Wilks

[57] ABSTRACT

A device for determining the measurement zone of an object which permits the adjustable setting of a plurality of measurement zones bounded by user-defined division points comprises a distance measurement apparatus for measuring a distance to an object, a specific division point setting circuit, such as a digital switch, for adjustably setting a specific distance point within the effective measurement range of the distance measurement apparatus, a circuit for adjustably setting one or more predetermined division points on at least one of the near side and the far side of the specific distance point, such that the specific distance point and the at least one predetermined division point define a plurality of measurement zones within the effective measurement range of the distance measurement apparatus, and a judgment circuit for judging which of the plurality of measurement zones a distance measurement result of the distance measurement apparatus belongs to. A measurement zone having a fixed width can be set by the setting circuit and the distance setting of division points can be performed by merely placing an object at an easily measurable point and pressing a switch. The division points can be set with very few manual operations. Also, a timer may be included to permit setting of the division point on the far side even when only one operator is present.

20 Claims, 14 Drawing Sheets

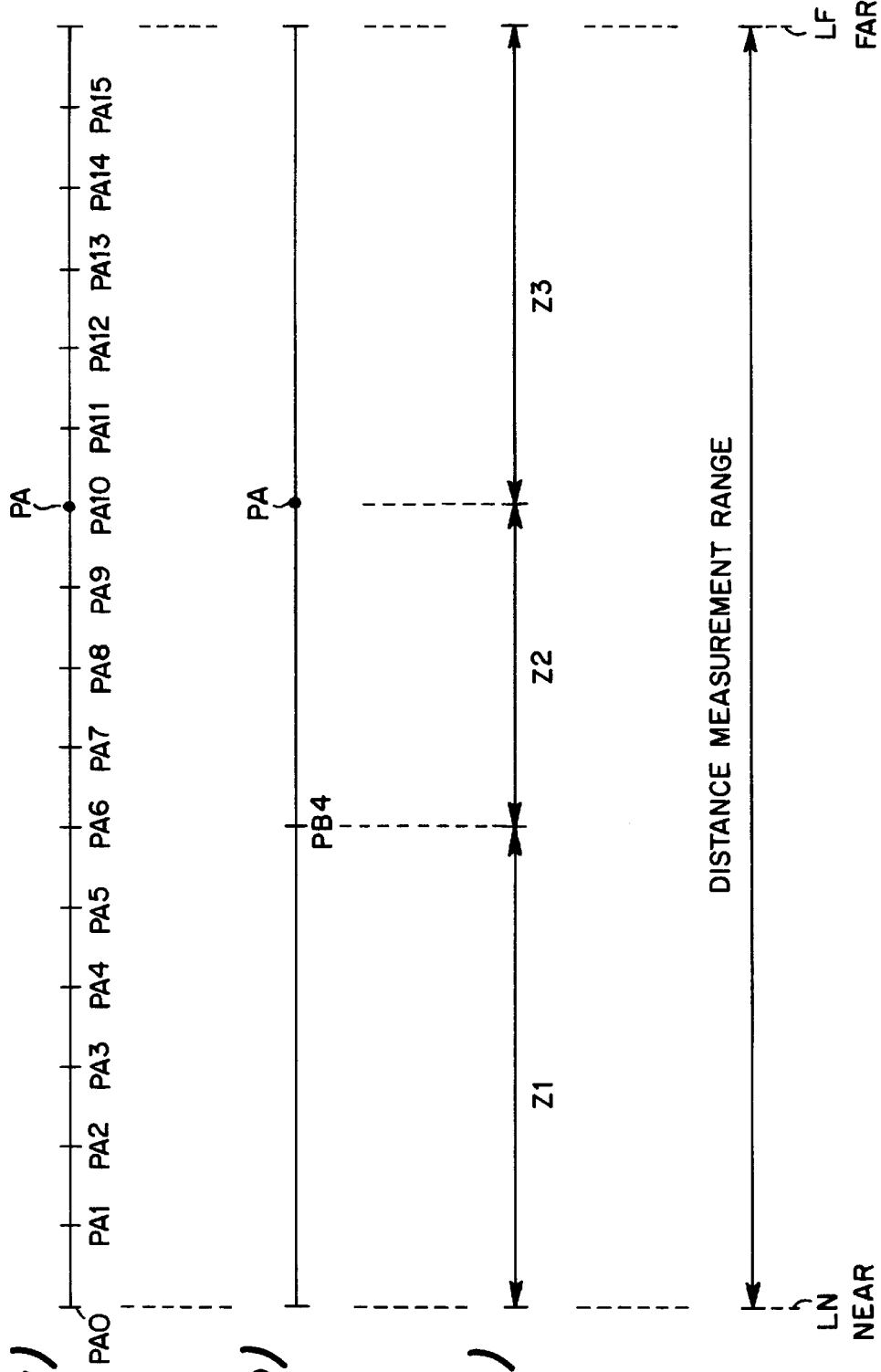

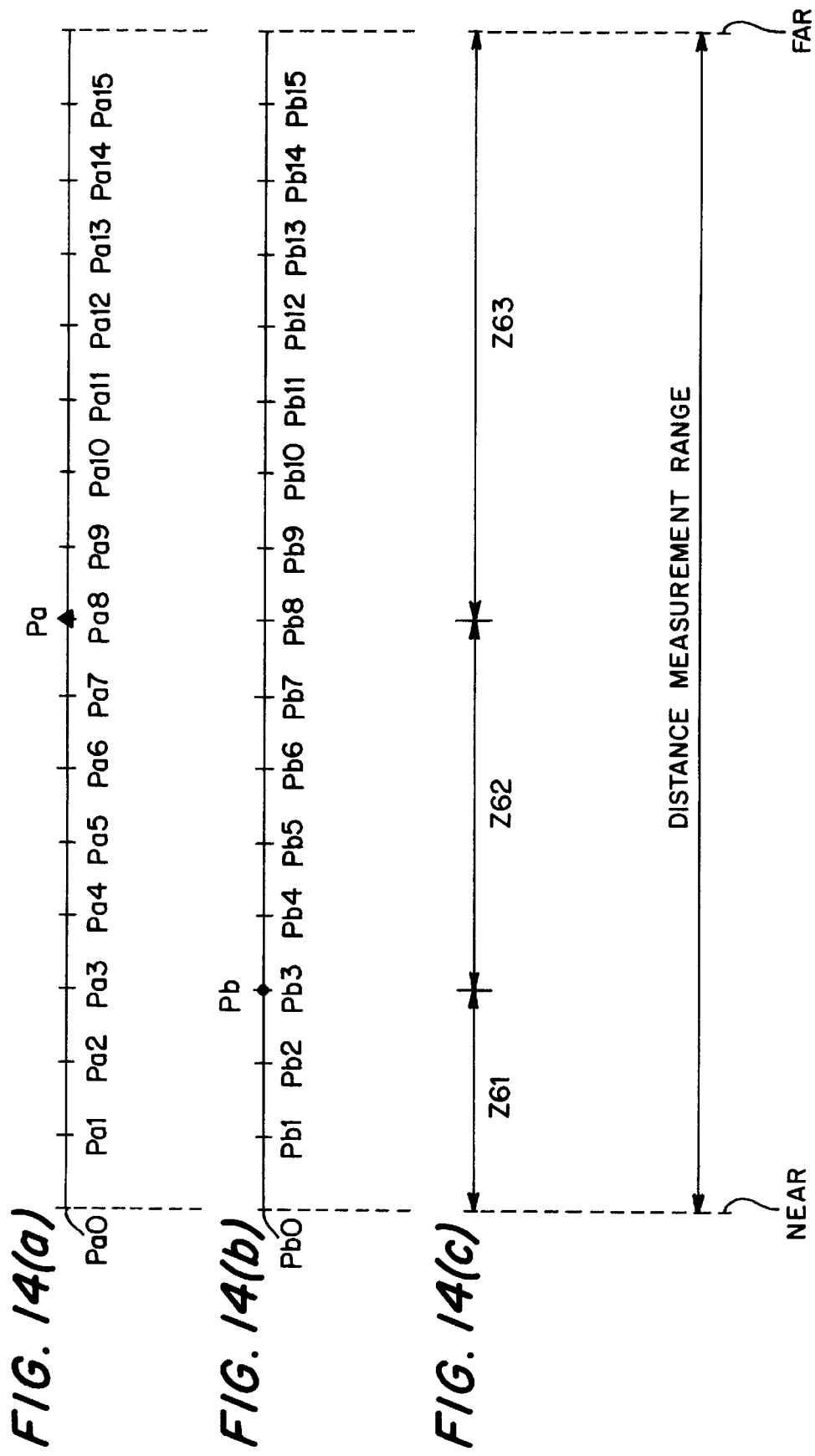

DEVICE FOR DETERMINING A DISTANCE RANGE OF AN OBJECT

FIELD OF THE INVENTION

The present invention relates generally to a distance measurement device and more particularly, to a distance measurement device for measuring the distance to an object, judging which of a plurality of user-defined measurement zones the distance measurement result belongs to, and producing a corresponding output.

BACKGROUND INFORMATION

Applicants have previously developed a distance measurement device which includes means for dividing the full distance measurement range of a conventional distance measurement means into a plurality of adjacent measurement zones, and which determines the respective measurement zone of an object measured by the device. In order to set the plurality of measurement zones, the full distance measurement range of the device is manually divided into a plurality of measurement zones by user-defined distance division points which separate each of the measurement zones.

One method for manually setting distance division points is described in Japanese Laid-Open Patent Application No. HEI 6-233276, filed by the present applicants. In accordance with this method, an object is placed a desired distance away from the distance measurement means at a point within the measurement range of the device which the user desires to set as a distance division point. The distance measurement means measures the distance to the object when a switch is pressed. The measured distance is then stored in a memory device as a first user-defined distance division point. A plurality of user-defined division points are obtained by moving the object to other points within the measurement range of the device and repeating the above operations. After setting of the plurality of division points, normal measurement operations may be commenced.

Operation of applicants' earlier distance measurement device will be explained in connection with the practical application thereof as an object detecting device, as shown, for example, in FIG. 13. A conventional distance measurement means is employed in an object detecting device M for detecting the passage of articles on parallel belt conveyors BC1, BC2, and BC3, each having a width W. If the right end of the belt conveyor BC1 is set by the user as one division point Pb and the right end of the belt conveyor BC2 is set as another division point Pa, then it will be possible to determine whether an object S belongs to a measurement zone Z61 when it is on the belt conveyor BC1, whether the object S belongs to a measurement zone Z62 when it is on the belt conveyor BC2, and whether the object S belongs to a measurement zone Z63 when it is on the belt conveyor BC3.

Setting of the user-defined measurement zones is graphically illustrated in FIGS. 14(a)–14(c). For example, when the measurement range of the distance measurement device is divided into three measurement zones, Z61, Z62 and Z63, as shown in FIG. 14(c), a far side division point, Pa, and a near side division point, Pb, can be set by the user with two division point setting means operating independently from each other, as shown in FIGS. 14(a) and 14(b). For example, each of the division point setting means may be a 4-bit digital switch capable of setting 16 possible fixed division points (Pa0 to Pa15 and Pb0 to Pb15).

In applicants' above-described object measurement device M, however, in order to set the respective distance division points Pa and Pb, it is necessary for an object to be physically placed on the right end of the belt conveyor BC1 before the switch is pressed to set the first division point Pb and to then place the object on the right end of the belt conveyor BC2 to set the second division point Pa. These operations are time consuming and inconvenient. Further, when the distance between the object detecting device M and the belt conveyors is changed (in FIG. 13, when the object detecting device M is moved from the position L1 indicated by solid lines to the position L2 indicated by broken lines), there is a problem in that the above-described series of operations must be repeated to reset both of the division points Pa and Pb to new distance values. In addition, when only one operator is present, these operations are difficult to perform.

Moreover, in applicants' earlier distance measurement device, the far side division point Pa and the near side division point Pb must be individually set by two independent division-point setting means and numerous manual operations are required. Thus, even in the case where the width of the measurement zones is constant, both of the distance division points Pa and Pb must be reset to new values by the two distinct division-point setting means when the distance between the object detecting device M and the belt conveyor is changed.

SUMMARY OF THE INVENTION

In view of the foregoing, it is an object of the present invention to provide a distance measurement device which is capable of setting a plurality of division points with a reduced number of manual operations.

Another object of the present invention is to provide a distance measurement device which simplifies resetting of the division points when the device has been moved.

Yet another object of the present invention is to provide a distance measurement device which may be easily operated by one user, even when the device is moved and resetting of the division points is required.

Still yet another object of the present invention is to provide a distance measurement device in which only one specific distance point is set by manual operation, and in which other division points may be set automatically without the need for performing manual measurements, such that only the specific distance point must be manually reset when the distance measurement device is moved.

In order to achieve the above objects and others which will become readily apparent to one of ordinary skill in the art, in a first aspect of the present invention, the distance measurement device comprises distance measurement means for measuring a distance to an object, judgment means for judging a measurement result of the distance measurement means, means for setting a specific distance point within a measurement range of the distance measurement means, and division point setting means for setting at least one division point on the near side of the specific distance point and at least one division point on the far side of the specific distance point. From the plurality of distance measurement zones defined by the respective division points set by the division point setting means, or the plurality of measurement zones defined by the specific distance point and the respective division points, the judgment means determines which of the plurality of measurement zones a measurement result of the distance measurement means belongs to.

Preferably, the division point setting means includes means for setting division points at predetermined equal distances on the near and far sides of the specific distance point. Alternatively, the second division point setting means includes means for setting division points at predetermined distances on one of the near side and the far side of the specific distance point, or means for setting division points in accordance with a predetermined percentage of the specific distance point, on the near side or far side of the specific distance point.

Preferably, the judgment means includes computation means for converting the specific distance point, the respective division points and the measurement result of the distance measurement means to comparable states.

In order to reduce the complexity of the computation means and the judgment means, the device preferably further comprises storage means for storing distance values corresponding to the respective division points set by the division point setting means.

In a second aspect of the present invention, a distance measurement device is provided which comprises a switch for generating a start signal for determining a specific distance point, distance measurement means for measuring a distance to an object in response to the start signal, memory means for storing the specific distance point, division point setting means for setting at least one predetermined division point on one of the near side and the far side of the specific distance point such that the specific distance point and the at least one predetermined division point define a plurality of measurement zones within a measurement range of the distance measurement means, and judgment means for judging which of the plurality of measurement zones the result of a distance measurement performed by the distance measurement means belongs to.

In a third aspect of the present invention, the distance measurement device comprises a switch for generating a start signal for determining a specific distance point, distance measurement means for measuring a distance to an object in response to the start signal, memory means for storing the specific distance point, division point setting means for setting at least one predetermined division point on each of the near side and the far side of the specific distance point such that the specific distance point and the at least one predetermined division point define a plurality of measurement zones within a measurement range of the distance measurement means, and judgment means for judging which of the plurality of measurement zones the result of a distance measurement of the distance measurement means belongs to.

In a fourth aspect of the present invention, the distance measurement device comprises a switch for generating a start signal for determining a specific distance point, distance measurement means for measuring a distance to an object in response to the start signal, first storage means for storing a distance measurement of the distance measurement means, second storage means for storing a difference between two distance measurements of the distance measurement means such that a plurality of measurement zones are defined by the distance measurement stored in the first storage means and the difference stored in the second storage means, and judgment means for judging which of the plurality of measurement zones the result of a distance measurement of the distance measurement means belongs to.

Preferably, a timer is connected to the switch for providing a predetermined delay time between the time that the switch is activated and the time that the start signal is generated.

BRIEF DESCRIPTION OF THE DRAWINGS

FIGS. 5($a$)–5($c$) are diagrams used to explain the relationship between a division point and a measurement zone in accordance with the present invention;

FIGS. 14($a$)–14($c$) are diagrams used to explain the problems to be solved by the present invention.

DETAILED DESCRIPTION OF THE PREFERRED EMBODIMENTS

The present invention will hereinafter be described in detail in accordance with preferred embodiments shown in the accompanying drawings.

Figure 1:
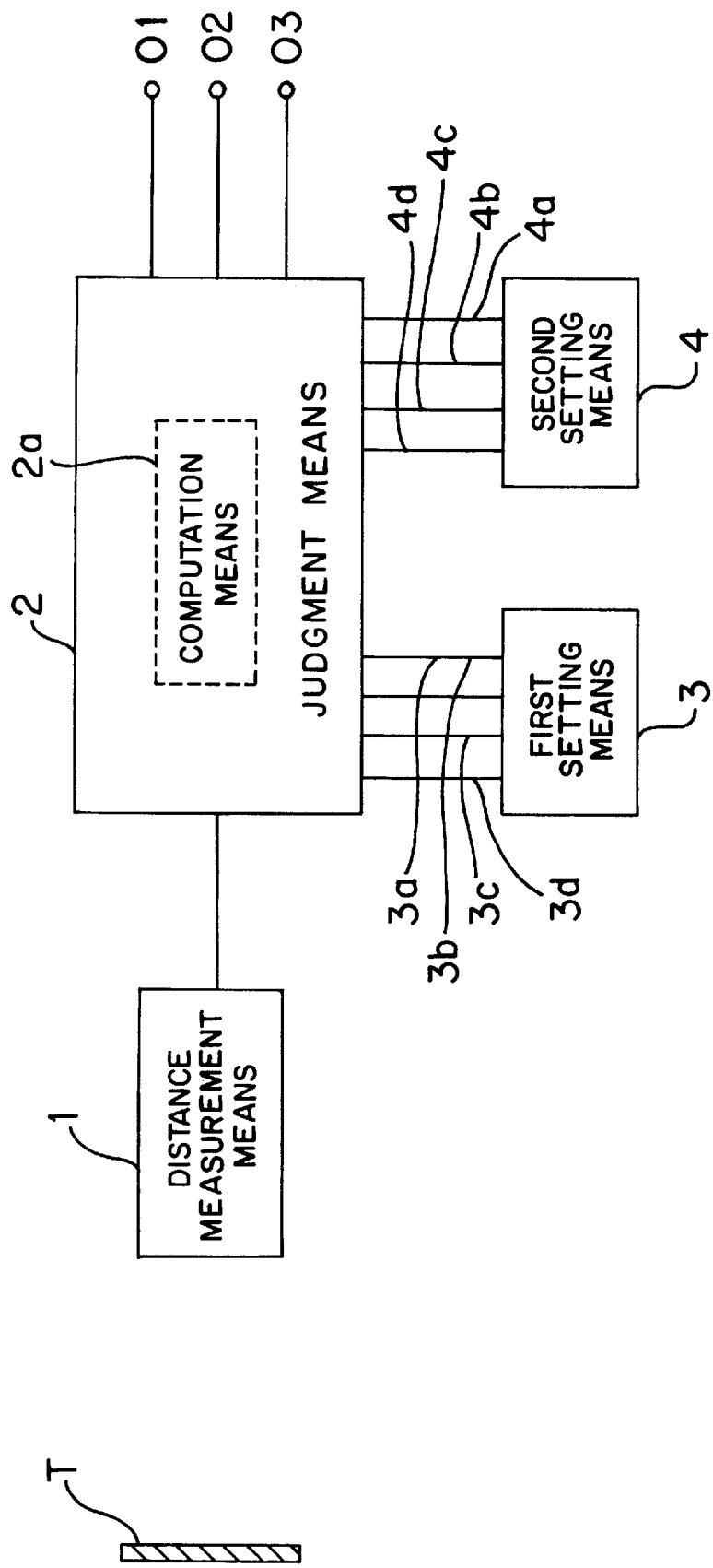
FIG. 1 is a circuit block diagram showing the construction of a distance measurement device in accordance with a first embodiment of the present invention.

FIG. 1 is a circuit block diagram showing the construction of a distance measurement device in a first embodiment of the present invention. For ease of discussion, there is shown an example in which the full range of distance measurement of the device is divided into three measurement zones with first and second division points set on the near and far sides of a specific division point set by a first division point setting means and a second division point setting means. In FIG. 1, reference numeral 1 denotes a distance measurement means for measuring the distance to an object T and for converting the measurement result into a digital signal. For example, a device which emits infrared rays and detects light reflected from the object T with a position sensing device (PSD) may be used, as may a device using ultrasonic waves. Reference numeral 3 denotes first division point setting means, such as a digital switch. By switching the output of a digital switch, the voltage levels of a plurality of signal lines are changed. In FIG. 1, a digital switch having four signal lines $3a$, $3b$, $3c$ and $3d$ is shown, and therefore 16 different settings are possible with combinations of the voltage levels of the signal lines. The first division point setting means 3 is used for setting a specific distance point within the distance measurement range of the above-described distance measurement means 1.

Reference numeral 4 denotes second division point setting means. As with the first division point setting means 3, 16 different output settings are possible with four signal lines 4a, 4b, 4c and 4d. The second division point setting means 4 is used for setting predetermined distance ranges ΔL on the near and far sides of the first division point set by the above-described first division point setting means 3.

Figure 2A:
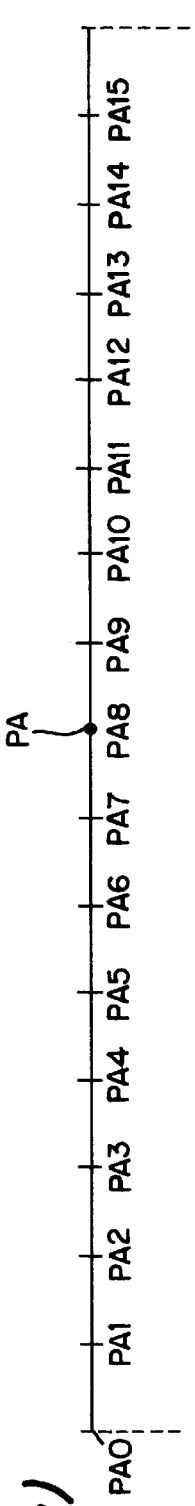
FIGS. 2($a$)–2($c$) are diagrams used to explain operation of the first embodiment of the present invention.
Figure 2B:
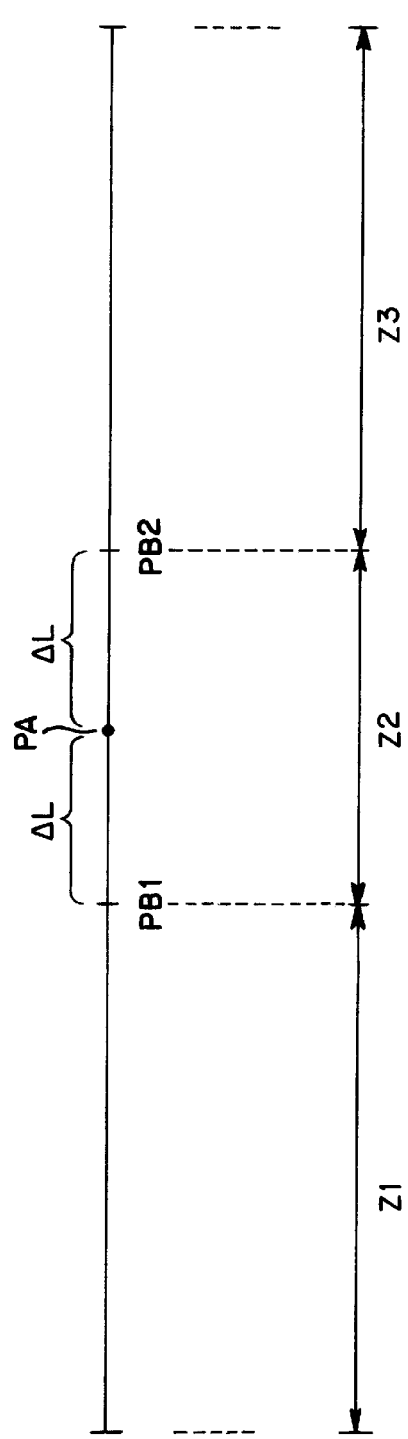
Figure 2C:
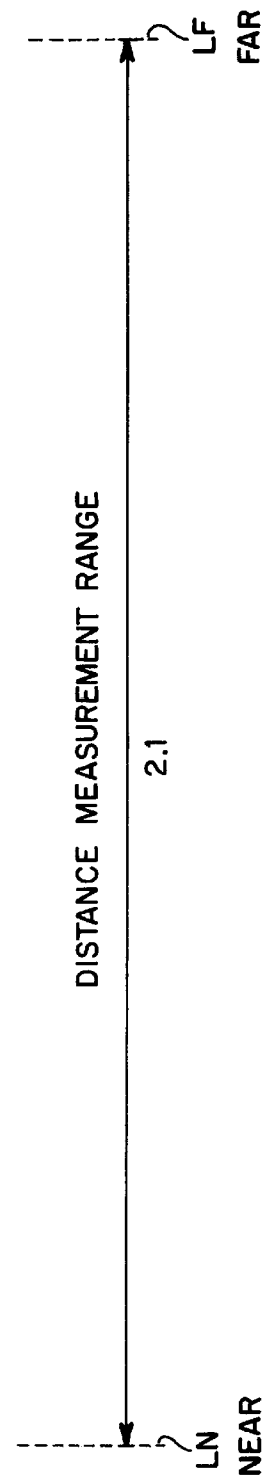

This relationship will be described with reference to FIGS. 2(a)–2(c). In FIGS. 2(a)–2(c), the horizontal axis represents a distance L from the distance measurement means 1. The farthest measurable point is LF (for example, 3.7 m), and the closest measurable point is LN (for example, 0.5 m). Accordingly, the full distance measurement range of the distance measurement means 1 is 3.2 m. Consider the case where the full range of distance measurement (LNF) is divided into 16 equal parts and 16 different settings of the first division point setting means 3 may be applied. Assuming that the above-described specific distance point is PA, then the specific distance point PA can be set to any of distance points Pan (where n is a natural number between 0 and 15), as shown in FIG. 2(a). In FIGS. 2(a)–2(c), the first division point PA has been set to PA8 (n=8), and a distance from the distance measurement means 1 becomes 2.1 m (0.5 m+0.2 m×8).

Although the second division point setting means 4 can be set to 16 different distance ranges ΔL, consider the case where one step is 5 cm. Assuming that a second, or near side division point, spaced from the specific distance point PA by a distance range ΔL is PB1 and a second, or far side distance point, spaced from the specific distance point PA by a distance range ΔL is PB2, then the division points PB1 and PB2 can be set within a range of 1.3 m (2.1 m−0.05 m×16) to 2.9 m (2.1 m+0.05 m×16) at intervals of 10 cm (i.e., (2.9 m−1.3 m)/16=10 cm). FIG. 2(b) illustrates the case where the second division point setting means has been set to the eighth step, i.e., ±40 cm have been set with respect to 1 m, and the distances of the first and second division points PB1 and PB2 from the distance measurement means 1 are to be set to 1.7 m and 2.5 m.

In the above-described embodiment, the distance range ΔL of the second division point setting means is constant (one step=5 cm). However, this distance range ΔL may be set to any specific value (for example, 2, 4, 5, 10, . . . , 25, 30, and 50 cm) using the 16 possible combinations of the set positions of the second division point setting means 4, i.e., the voltage levels of four signal lines 4a, 4b, 4c and 4d.

Returning to FIG. 1, reference numeral 2 denotes judgment means for determining the particular measurement zone that each distance measurement performed by the distance measurement means 1 belongs to, from the three measurement zones Z1, Z2 and Z3 (see FIG. 2(c)) which are defined by the division points PB1 and PB2. The judgment means 2 outputs the result of the judgment to output terminals O1, O2 and O3. If, for example, the distance measurement result of the distance measurement means 1 is 1.1 m, it will be in measurement zone Z1 and therefore only O1 will be set to a high voltage level. If the distance measurement result of the distance measurement means 1 is 2.2 m, it will be in measurement zone Z2 and therefore only O2 will be set to a high voltage level. Similarly, if the distance measurement result of the distance measurement means 1 is 2.8 m, it will be in measurement zone Z3 and therefore only the voltage on O3 will be set to a high voltage level. As will be appreciated, the present invention is not limited to the above-described output format and any output format capable of separately indicating the plural measurement zones may be used, such as a two-bit digital output scheme.

When the measurement result of the distance measurement means 1 is outside the distance measurement range LNF, outputs different from those described above may be generated. For example, all of the output terminals O1 to O3 may be set to high voltage levels, or the result may be output to an additional output terminal.

Next a description will be made of an actual judgment method of the judgment means 2. The distance measurement means 1 first projects infrared light toward an object T and then receives light reflected from the object T with a position sensing device (hereinafter referred to as a PSD). If the distance to the object T changes, the position of light incident on the PSD will change. The PSD converts the position of the incident light into two current outputs i1 and i2. In this case, the current i1 corresponds to the current of the short distance end of the PSD, and the current i2 corresponds to the current of the long distance end of the PSD. From the currents i1 and i2 that are output in this manner the following number NP which corresponds to the distance to the object T is obtained based on Equation (1).

$$NP = i1/(i1+i2) \tag{1}$$

In Equation (1), the number NP is substantially proportional to the inverse of the distance L. Therefore, in order to determine which measurement zone a measurement performed by the distance measurement means 1 belongs to, it is necessary for the states of the above-described specific distance point and division points PB1 and PB2, which were set by the first division point setting means 3 and the second division point setting means 4, to be converted into mutually comparable quantities. Reference numeral 2a in FIG. 1 represents computation means for performing this function.

Figure 3:
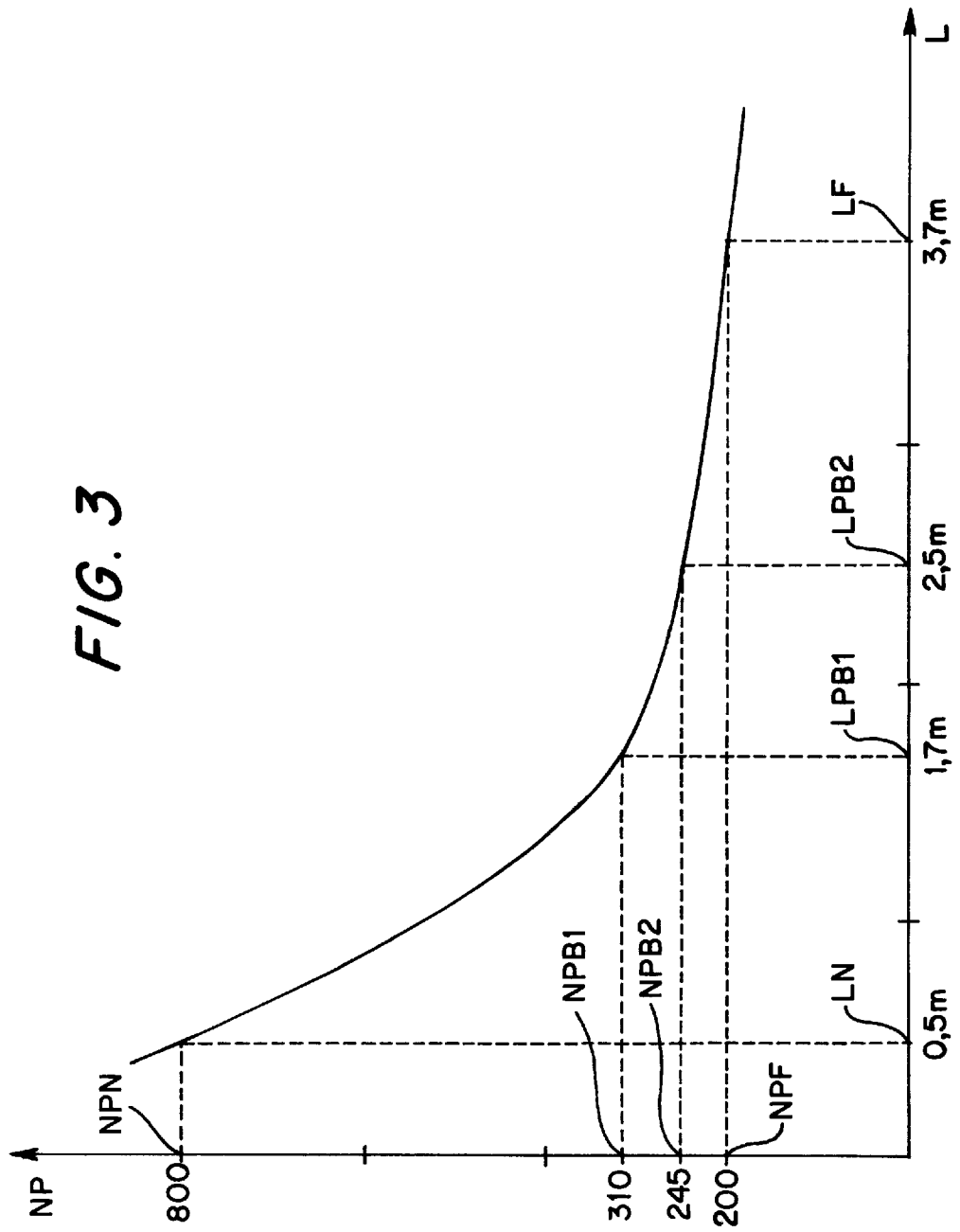
FIG. 3 is a graph used to explain operation of the judgment means in an embodiment of the present invention.

FIG. 3 is a graph showing the relationship between the above-described pulse number NP and the distance L between the distance measurement means 1 and the object T. The numbers corresponding to the closest point LN and farthest point LF are values that are determined by the particular construction of the distance measurement means 1, and these numbers are assumed to be NPN and NPF, respectively.

If it is now assumed that the pulse number equivalent to the distance value LP of the division point that is set is NPx, the following Equations (2) to (4) will be satisfied.

$$Npx = (NPN - NPF) \cdot (1/LP - 1/LN)/(1/LN - 1/LF) + NPN \tag{2}$$

$$LPB1 = LPA - \Delta L \times m \tag{3}$$

$$LPB2 = LPB + \Delta L \times m \tag{4}$$

wherein LPA is the distance value of the specific distance point PA, LPB1 and LPB2 are the distance values of the first and second division points PB1 and PB2, respectively, m is a natural number between 1 and 16, and LPB1 or LPB2 is substituted for LP.

While it has thus far been described that the distances LPB1 and LPB2 of the division point PB1 and PB2 are 1.7 m and 2.5 m, respectively, it can now be seen that these values may be calculated based on the calculation of the above-described Equations (3) and (4). Assuming that NPN=800, NPF=200, and the pulse numbers of the above-described division points are NPB1 and NPB2, then NPB1=310 and NPB2=245 will be obtained by the above-described Equation (2). Therefore, when the pulse number of the measurement result obtained by the distance measurement means 1 is less than 245, the distance measurement result can be judged to belong to the distance area Z3. When the pulse number of the distance measurement result obtained by the distance measurement means 1 is greater than 245 and less than 310, the distance measurement result can be judged to belong to the distance area Z2. When the pulse number of the distance measurement result obtained by the distance measurement means 1 is greater than 310, the distance measurement result can be judged to belong to the distance area Z1.

While in the above-described embodiment the number NP has been assumed to be substantially proportional to the inverse of the distance L and has been computed according to Equation (2), a correction term may be added to this equation, or accuracy of judgment can be increased by using an optimizing equation, depending on the specific type of the distance measurement means.

Further, since in the above-described embodiment the second division point-setting means 4 has set equal distance ranges on the near and far sides of the specific point PA, the space between the division points PB2 and PB1 would remain constant even if the distance of the first division point PA may be set on the near and far sides of the specific point PA, depending on the application. That is, the second division point setting means can set, for example, 2%, 4%, 6%, . . . , 10%, 15%, and 20%. When 15% is set and the distance of the specific distance point is set to 2.1 m by the first division point setting means 3, the division point PB1 is set to 1.785 m (2.1 m×0.85) and the division point PB2 is set to 2.415 m (2.1 m×1.15). Also, when the first division point PA is set to 1.4 m, the second division point PB2 is set to 1.61 m (1.4 m×1.15). Therefore, if the distance value of the specific distance point PA changes, the space between the division points PB2 and PB1 will also change.

While in the above-described embodiments, equal distance ranges have been set on the near and far sides of the specific distance point PA, a ratio of the near side distance and the far side distance may be set to a predetermined value. That is, the second division point setting means may be adapted to set the distance of a difference between the division points PB1 and PB2 to any of 16 different values (for example, 60 cm), on the near and far sides of the specific distance point PA.

Further, as a method of setting the second division point setting means, various modifications are possible. Several such modifications are discussed below.

Figure 4A:
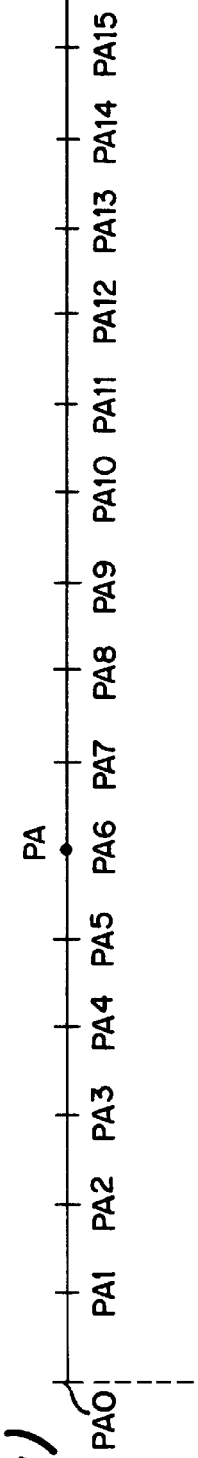
FIGS. 4($a$)–4($c$) are diagrams used to explain the relationship between a division point and a measurement zone in accordance with the present invention.
Figure 4B:
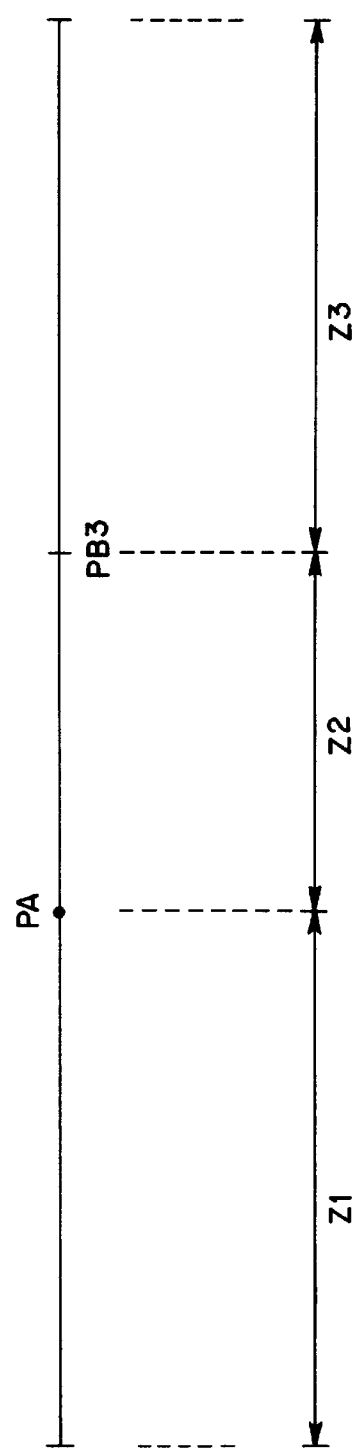
Figure 4C:
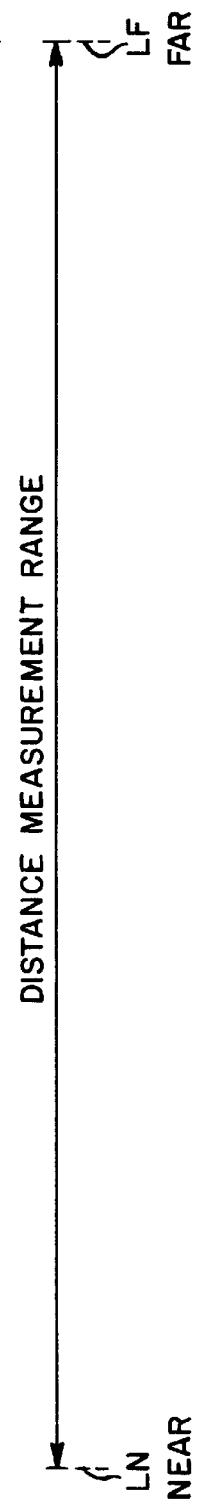

FIGS. 4 and 5 show the relationship between a division point and a distance area. FIG. 4 illustrates a modification in which the second division point setting means 4 sets a predetermined distance range on only the far side of the specific distance point PA set by the first division point setting means 3. The second division point setting means 4 can be set to any of 16 different values at intervals of, for example, 10 cm. If the specific distance point PA is PA6 (1.7 m) when the second division point setting means is set to the eighth step, i.e., 80 cm, the division point PB3 will be 2.5 m (1.7 m+0.8 m). The full distance measurement range of the device is accordingly divided into three measurement zones Z1, Z2 and Z3 by the first division point PA and the second division point PB3.

FIG. 5 illustrates a modification in which the second division point setting means sets a predetermined distance range on only the near side of the specific point PA set by the first division point setting means. The second division point setting means can be set to any one of 16 steps at intervals of, for example, 10 cm. If the specific point PA is PA10 (2.5 m), when the second division point setting means is set to the eighth step, i.e., 80 cm, the division point PB4 will be 1.7 m (2.5 m−0.8 m). The full distance measurement range of the device is accordingly divided into three measurement zones Z1, Z2 and Z3 by the first division point PA and second division point PB4.

Figure 6:
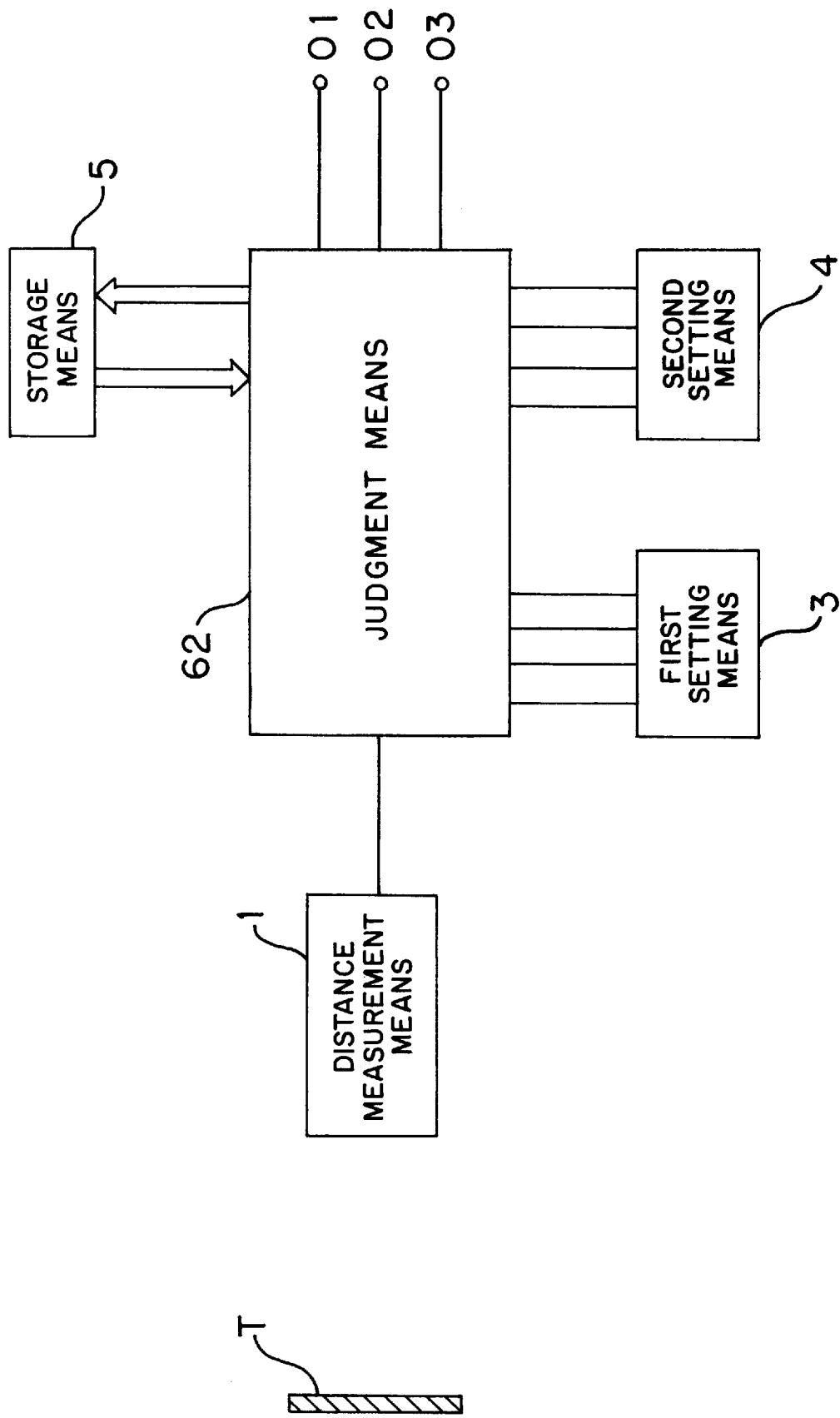
FIG. 6 is a circuit block diagram showing the construction of a distance measurement device in accordance with the second embodiment of the present invention.

Next, a second embodiment of the present invention will be described in accordance with FIG. 6. FIG. 6 is a circuit block diagram showing the construction of the second embodiment. Reference numeral 62 represents judgment means for judging which measurement zone a measurement result of the distance measurement means 1 belongs to. Reference numeral 5 represents storage means. The same reference numerals will be applied to the same parts as in FIG. 1.

The storage means 5 calculates all distance values of the division points PB1 and PB2 corresponding to the settings of the first division point setting means 3 and the second division point setting means 4 with Equations (3) and (4) described in the first embodiment and stores these calculated values.

In the device of FIG. 6, when the first division point setting means 3 and the second division point setting means 4 are set, the judgment means 62 will read out the distance values of the division points PB1 and PB2 from the storage means 5. The measurement zone that the result belongs to is judged by converting the result into a corresponding number NP with Equation (2) and by comparing the converted result with the distance measurement obtained by the distance measurement means 1. Therefore, it becomes unnecessary for the judgment means 62 to perform the calculation of Equations (3) and (4).

Also, while the distance value has been stored in the storage means 5, a number NP corresponding to the distance value calculated in advance by the above-described Equations (2), (3) and (4) may be stored directly. By doing this, the calculation of Equation (2) also becomes unnecessary and the complexity of the judgment means 62 is reduced.

Figure 7:
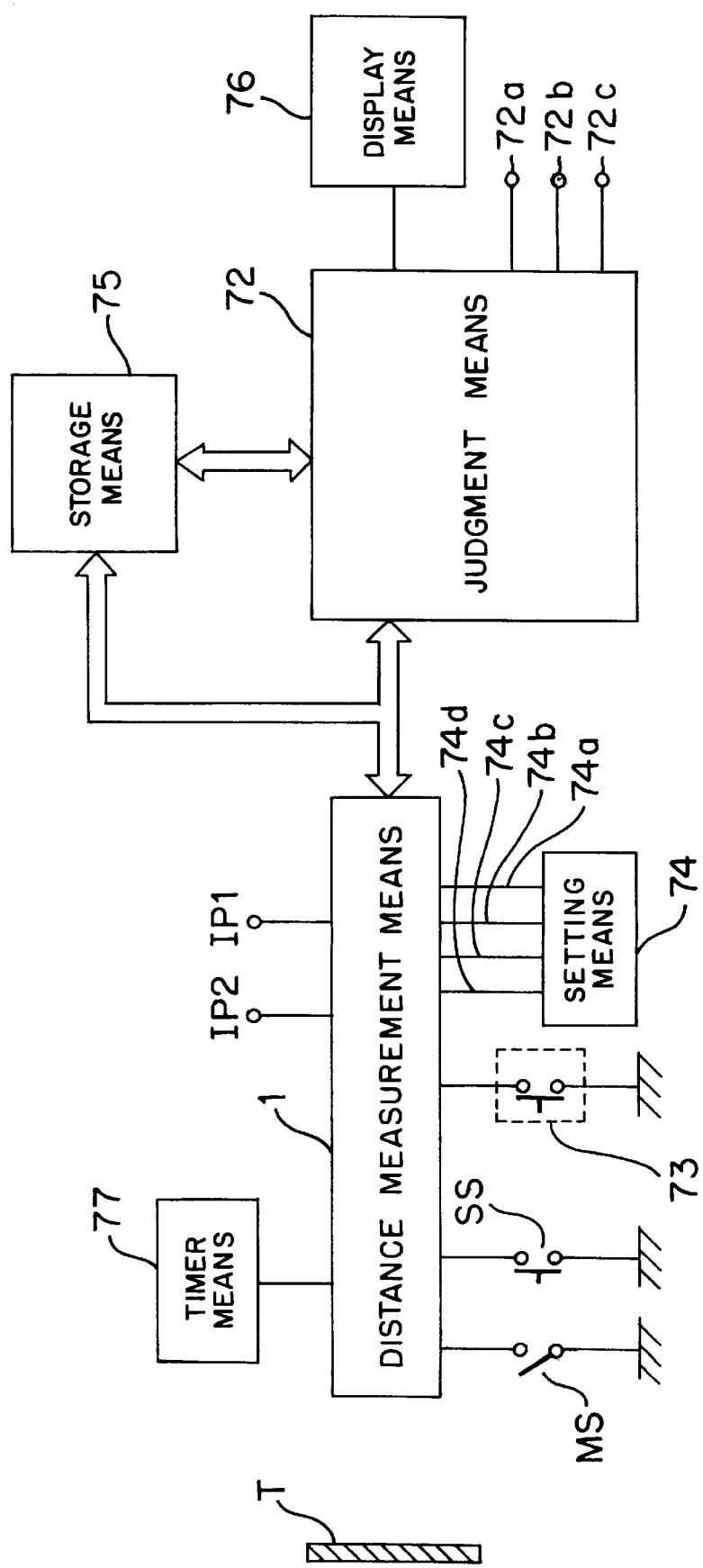
FIG. 7 is a circuit block diagram showing the construction of a distance measurement device in accordance with a third embodiment of the present invention.

FIG. 7 is a circuit block diagram showing the construction of a distance measurement device in accordance with a third embodiment of the present invention. For ease of discussion, there is shown a case where the full measurable range of the device is divided into three measurement zones, Z1, Z2, and Z3, with two distance division points as in the first and second embodiments. As will be appreciated by those of ordinary skill in the art from the following discussion, the present invention is not limited to three measurement zones and any number of measurement zones may be provided by setting a plurality of division points. In particular, (k+1) measurement zones may be provided by the setting of k division points, where k is any integer value greater than zero.

In FIG. 7, reference numeral 1 denotes a distance measurement means for measuring the distance to an object T. The distance measurement means 1 has an external switch 73 for generating a start signal for determining a specific distance point which becomes a reference point for setting additional distance division points. A start switch SS is connected to the distance measurement means 1 for generating a start signal to commence normal distance measurement operations.

Reference numeral 74 denotes setting means for setting a predetermined distance value on the near side or far side of the specific point described above, or on both of the near side and far side, respectively. In the present embodiment, the setting means 74 comprises a 4-bit digital switch capable of 16 different digital output settings with four output signal lines 74a through 74d. Reference numeral 75 denotes a storage means for storing distance information corresponding to the specific point obtained by pressing the switch 73.

The distance measurement means 1 is provided with a pair of input lines IP1 and IP2 for selecting whether a division point set by the setting means 74 is to be on the near side or the far side of the specific point. That is, when the input signal IP1 is at a high voltage level (hereinafter referred to as IP1="H") and the input signal IP2 is at a low voltage (hereinafter referred to as IP2 "L"), a predetermined division point set by the setting means 74 is set on the near side of the specific point, and when IP1="L" and IP2="H," a predetermined division point is set on the far side of the specific point Hereinafter, the case where a predetermined division point is set on only one side of the specific point is referred to as one-side setting. When IP1="H" and IP2=H, a division point is set on both of the near and far sides of the specific point. Hereinafter, the case where a predetermined division point is set on both sides of the specific point is referred to as two-side setting.

Reference numeral 72 denotes a judgment means for judging which of a plurality of measurement zones the distance measurement result of the distance measurement means 1 belongs to. A plurality of measurement zones are defined by distance division points that are based on the specific point stored in the storage means 75. Reference numeral 76 denotes display means for displaying that the distance data of the division points have been stored in the storage means 75. Output lines 72a, 72b, and 72c of the judgment means serve as output means for providing an output which is indicative of the measurement zone which has been determined by the judgment means 5.

Reference numeral 77 denotes timer means. If the switch 73 is pressed, the timer means 77 will start its operation and delay output of the above-described start signal for a predetermined delay time to store the distance information of the specific point in the storage means 75. When the timer means 77 is operated, the mode switch MS connected to the distance measurement means 1 is switched on, and when not operated, the mode switch MS is switched off.

Figure 8A:
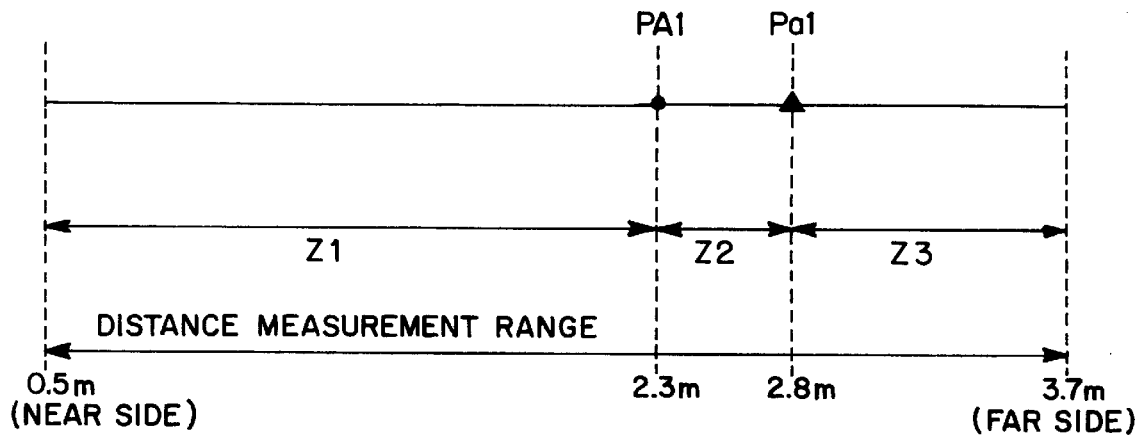
FIGS. 8($a$)–8($c$) are diagrams used to illustrate operation of the third embodiment of the present invention.

Operation of the third embodiment of the present invention will now be described with reference to FIGS. 8(a)–8(c). In this embodiment, it is assumed that the full distance measurement range of the distance measurement means 1 is between 0.5 m and 3.7 m and that the setting means 74 can set 5 cm per step, i.e., a maximum of 80 cm (5 cm×16 steps). Also, in the foregoing example it is assumed for ease of discussion that the mode switch MS is off and input signals are IP2="H" and IP1="L" (one-side setting).

First, an operator using the distance measurement device places an object at a certain unknown distance from the distance measurement device and presses the switch 73. When the switch 73 is pressed, the start signal will be generated, and the distance measurement means 1 will perform a distance measurement operation to measure a distance to the object and store the resulting distance data DPA1 (for example, 2.3 m) in the storage means 75. At this time, the display means 76 will display that the distance data has been stored in the storage means. As shown in FIG. 8(a), the point of this distance data is a specific point and becomes one user-defined division point PA1. If the setting means 74 is then set to the tenth step, i.e., 50 cm, the judgment means 72 sets, as the division point Pa1 on the far side, a value of 2.8 m obtained by adding 50 cm to the distance data DPA1 (2.3 m). The measurement zones that are defined by the division points PA1 and Pa1 are, Z1, which is from 0.5 m to 2.3 m, Z2, which is from 2.3 m to 2.8 m, and Z3, which is from 2.8 m to 3.7 m.

If the start switch SS is pressed at this time, the distance measurement means 1 will perform a normal distance measurement operation. Any known method for performing the distance measurement operation is within the scope of the present invention. For example, a single distance measurement operation may be performed each time the start switch SS is pressed, or distance measurement operations may be performed at predetermined intervals (for example, at intervals of 0.5 seconds) during the period of time that the start switch SS is pressed.

When the distance measurement operation ends, the judgment means 72 will judge which area the distance data DPx belongs to from the three measurement zones Z1, Z2, and Z3 described above, and will output the result of the judgment to the output terminals 72a, 72b, and 72c. If the distance measurement result of the distance measurement means 1 is 1.9 m, it will be in the measurement zone Z1. Therefore, only the terminal 72a will be set to an "H" level, and terminals 72b and 72c set to "L" levels. If the measurement result of the distance measurement means 1 is 2.5 m, it will be in the measurement zone Z2 and therefore only the terminal 72b will be set to an "H" level. If the distance measurement result is 3.0 m, it will be in the measurement zone Z3 and therefore only the terminal 72c will be set to an "H" level. In accordance with this series of operations, the measurement zone in which the object is located can be easily detected.

It should be appreciated that if the step setting of the setting means 74 is changed, the location of a division point will be changed since the division point is determined by adding the value output by the setting means 74 to the distance value DPA1 of the specific point PA1.

Next, consider the case where the voltage levels of input signals are IP2="L" and IP1="H" and, as in the above described embodiment, the setting means 74 has been set to the tenth step, i.e., 50 cm. As shown in FIG. 8(b), the judgment means 5 sets a value of 1.8 m, obtained by subtracting 50 cm from the distance data DPA1 (2.3 m), to the division point Pb1 on the near side. And, for the measurement zones that are divided at the division points PA1 and Pb1, Z1 becomes 0.5 m to 1.8 m, Z2 becomes 1.8 m to 2.3 m, and Z3 becomes 2.3 m to 3.7 m.

Figure 8B:
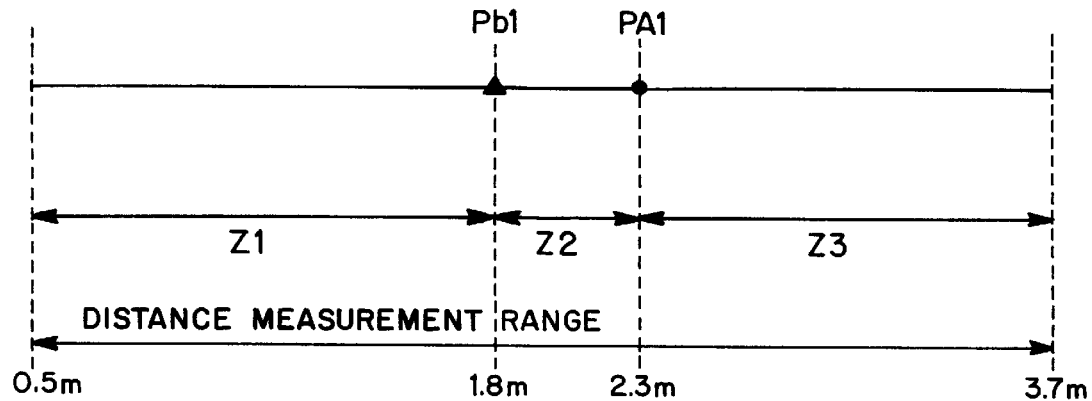
Figure 8C:
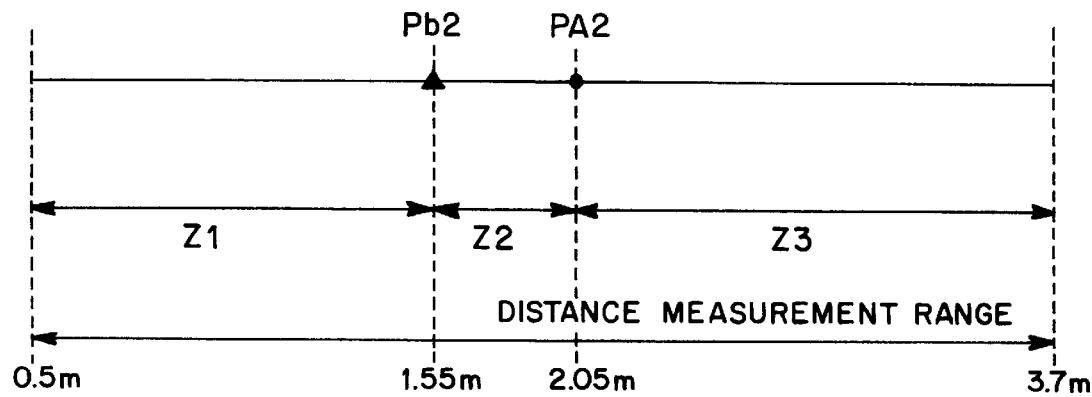

FIG. 8(c) illustrates the case where the distance measurement device has been moved from the location of FIG. 8(b) toward an object and the operator has pressed the switch 73. If the setting of the setting means 74 has not been changed, only the distance of the specific point will need to be changed without changing the width (50 cm) of the measurement zone Z2. That is, if the distance of the specific point PA2 (division point on the far side) becomes 2.05 m, then the distance of the specific point Pb2 on the near side will become 1.55 m.

Figure 13:
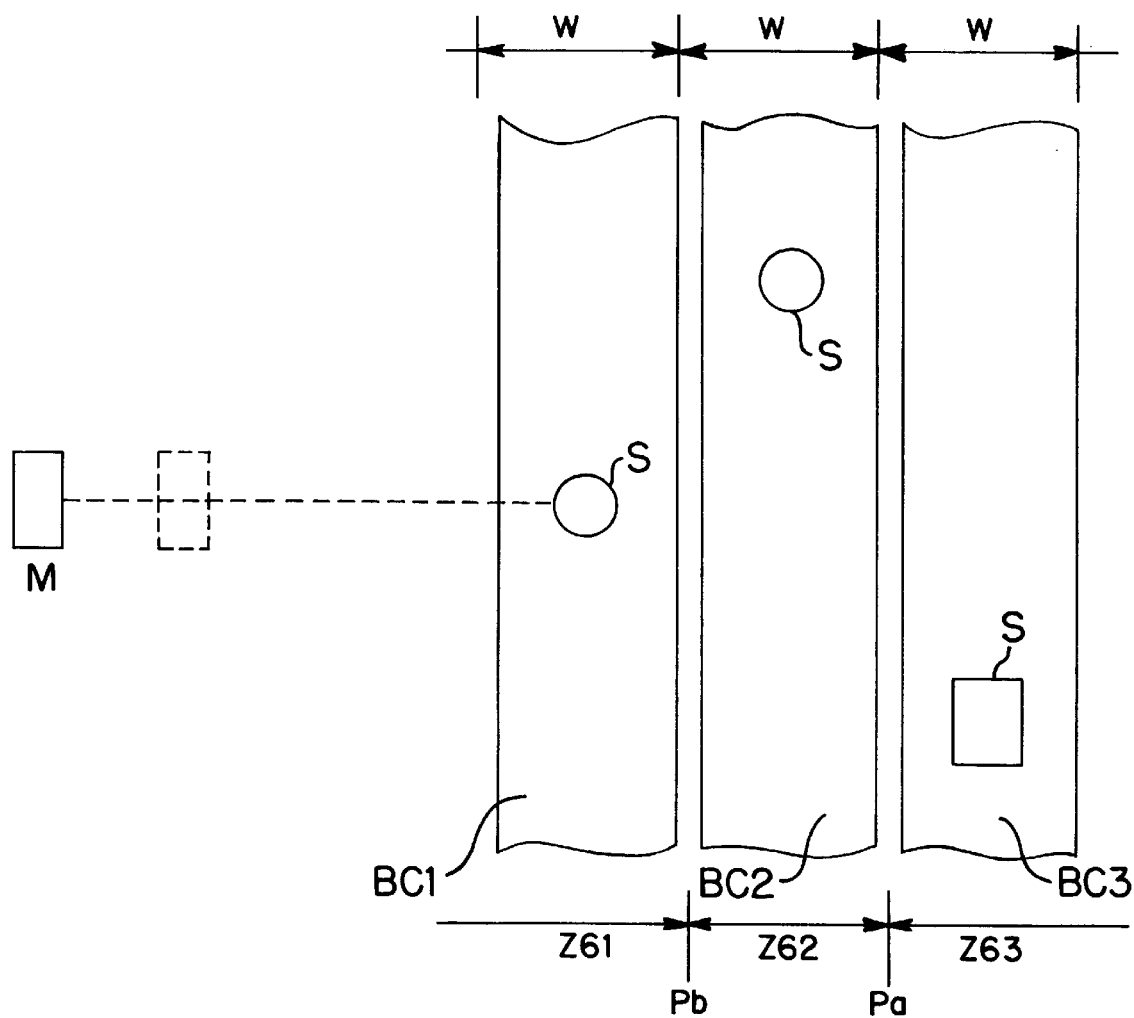
FIG. 13 is a diagram used to explain the operation of an object detecting device using the distance measurement device of the present invention.

If the width of the central belt conveyor BC2 is 50 cm in the case of the belt conveyor example shown in FIG. 13, the setting means 74 will be set to 50 cm. With this setting, even if the distance measurement device is moved from a position L1 to a position L2, all measurement zones are automatically reset by placing the object on the right end of the belt conveyor BC1 and pressing the switch 73. Therefore, only a single operation is needed to reset all of the measurement zones when the distance measurement device is moved.

Next, a description will be provided of the case where the input signals IP1 and IP2 in FIG. 7 are both set to "H" levels (two-side setting). As described above, the operator using the distance measurement device of the present invention places an object at a certain location away from the distance measurement device and presses the switch 73. The distance measurement means 1 performs a distance measurement operation to measure the distance to the object, and stores the distance data DPA3 (for example, 2.3 m) in the storage means 75. At this time, the display means 76 displays for a predetermined time that the distance data has been stored in the storage means.

When the setting means 74 has been set to the fifth step, i.e., 25 cm, the judgment means 72 sets, as the division point Pa3 on the far side, a value of 2.55 m obtained by adding 25 cm to the distance data DPA3 (2.3 m) of the specific point PA3, as shown in FIG. 3(a). Also, the judgment means 72 sets, as the division point Pb3 on the near side, a value of 2.05 m obtained by subtracting 25 cm. Therefore, for the measurement zones that are divided at the division points Pa3 and Pb3, Z1 becomes 0.5 m to 2.05 m, Z2 becomes 2.05 m to 2.55 m, and Z3 becomes 2.55 m to 3.7 m. In this case, the specific distance point does not serve as an actual division point, as in the previous example, but merely serves as a reference point for the setting of the other division points.

Figure 9A:
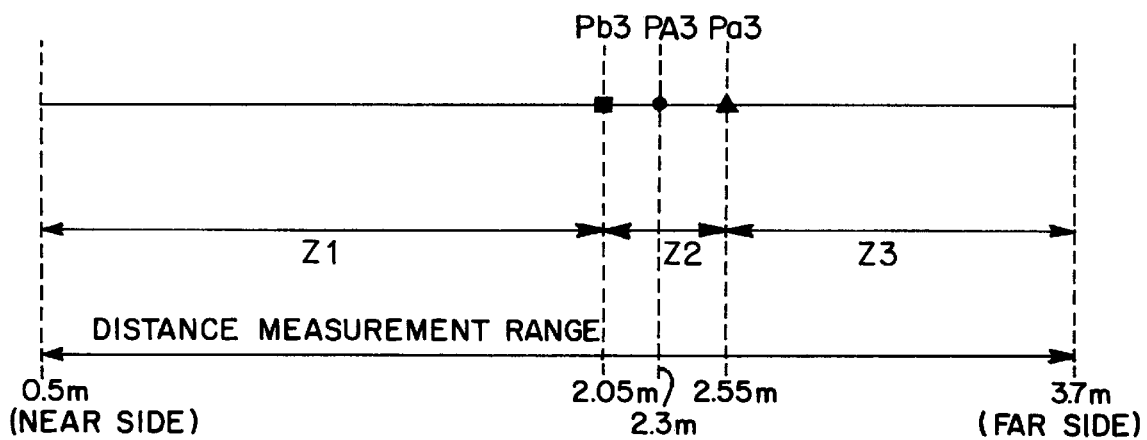
FIGS. 9($a$)–9($b$) are diagrams used to explain operation of the third embodiment of the present invention.
Figure 9B:
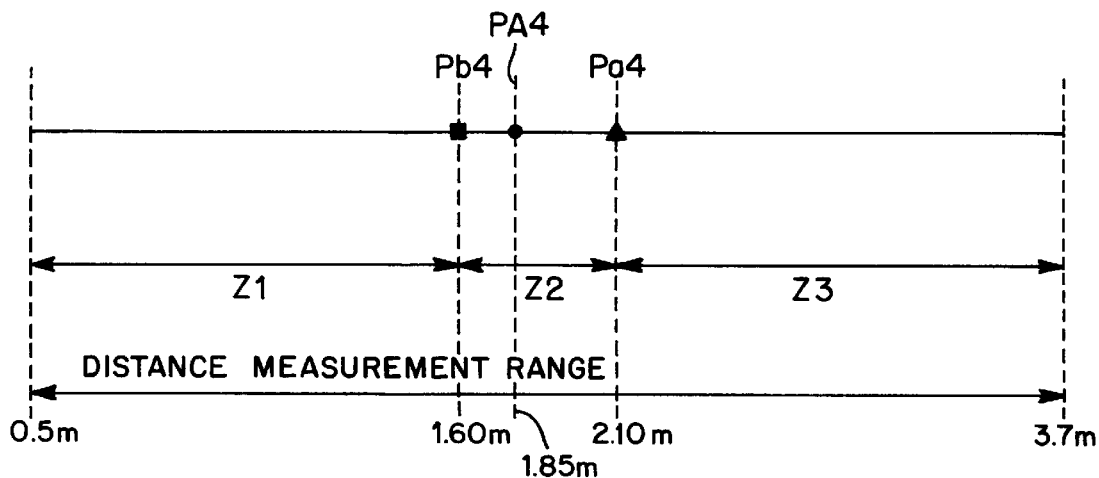

FIG. 9(b) illustrates the case where the distance measurement device has been moved from the state of FIG. 9(a) toward an object and the operator has pressed the switch 73. If the setting of the setting means 74 has not changed, the distance from the distance measurement device will be able to be changed without changing the width (50 cm) of the measurement zone Z2. That is, if the distance of a specific point PA4 becomes 1.85 m, then the distance of a division point Pb4 on the near side will become 1.6 m and a division point Pa4 on the far side will become 2.1 m.

At the time of this both-side setting in the belt conveyor example shown in FIG. 13, if the width of the central belt conveyor BC2 is 50 cm, the setting means 74 will be set to 25 cm. Accordingly, even if the distance measurement device were moved from the position L1 to the position L2, all measurement zones are automatically set by placing an object in the center of the belt conveyor BC2 and pressing the switch 73. Therefore only a single operation is needed.

In the case of both-side setting, if the distance step of the setting means 74 is set so that it automatically becomes ½ the case of one-side setting, in the same step of the setting means 4 the width of the measurement zone Z2 will be able to be set to the same value at the time of both of one-side setting and both-side setting.

In the manner described above, the division points can simply be set. But, there are instances where a distance measurement device is fixed or difficult to move, or where there is no appropriate object available for use in setting of the division points. In such instances, division points may be set by interrupting the distance measurement range with the operator's hand. In the case of one operator, however, the set distance will be limited to the operator's reach. While use of a remote control unit to obtain the same function as the above-described switch 73 is conceivable, it would result in a substantial increase in circuit size, complexity and cost.

In order to permit one operator to set any desired specific point within the range of the device, a timer means 77 is used. If the mode switch MS in FIG. 7 is turned on, the timer means 77 will be in its operating mode. If the set switch 73 of the specific point is pressed, then the timer means 77 will start timing and the display means 76 will inform the operator that the timer 77 is being operated. Time out of the timer means 77 is set for 10 seconds. The display means 76 emits a continuous light for the first 7 seconds of the 10-second period of time that the timer means 77 operates, and is turned on and off for the remaining 3 seconds. With this, the operator is informed that time out of the timer means 77 is approaching. The distance measurement means 1 is in its standby state until the timer means 77 has timed out and does not perform the distance measurement operation until that time. The operator moves to a desired position during 10 seconds that the timer means 77 is operating, and stops at that position. When the timer means 77 times out after the elapse of a predetermined time, the start signal will be generated and the distance measurement means 1 will start the distance measurement operation and measure a distance to the operator. The distance data is stored in the storage means 75. If the timer means 77 is used, division points will be able to be set to any value within the measurement range of the device without difficulty even when there is one operator.

Figure 10:
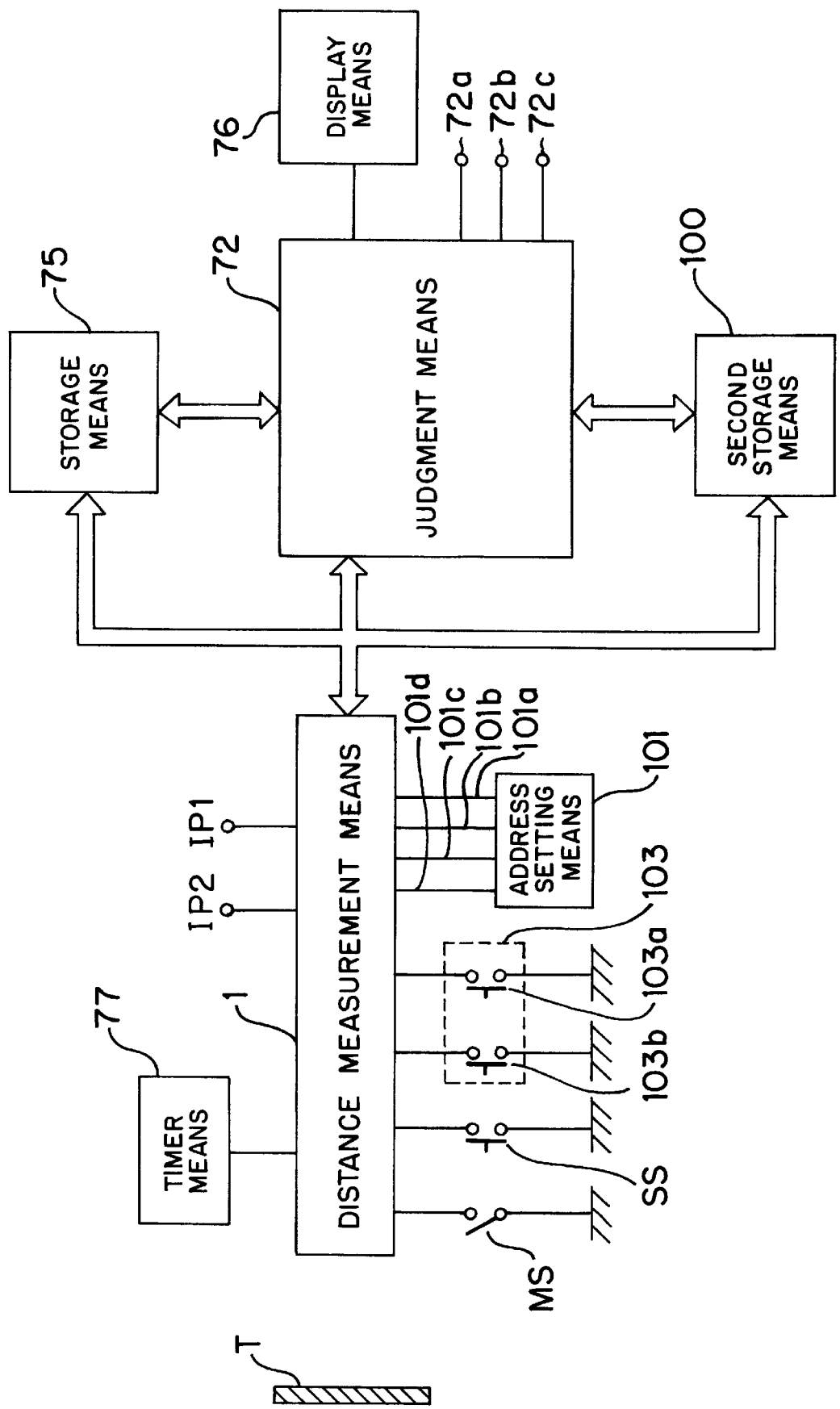
FIG. 10 is a circuit block diagram showing the construction of a distance measurement device in accordance with a fourth embodiment of the present invention.

The fourth embodiment of the present invention will now be described. In the third embodiment, since the distance value that can be added to or subtracted from the specific point is a predetermined value set by the setting means 74, the resolution of the setting means 74 must be increased in order to set a fine distance value. The fourth embodiment solves this problem. FIG. 10 is a circuit block diagram showing the fourth embodiment. The elements of FIG. 10 having the same reference numerals as in FIG. 7 represent the same parts and a detailed description thereof is omitted. In FIG. 10, a switch 103a is used to control the distance measurement means 1 to measure the distance to a first specific point and store this value in storage means 72. Switch 103b is used for controlling the distance measurement means 1 to measure a distance to a second specific point. The switches 103a and 103b constitute a switch 103 for generating a start signal.

Reference numeral 100 denotes a second storage means, which stores the value ΔDn of the difference between the first and second specific points obtained by pressing the switches 103a and 103b (this difference will hereinafter be referred to as simply a distance difference ΔDn). Reference numeral 101 denotes an address setting means for setting an address of the storage means when a plurality of distance differences ΔDn are stored. In this embodiment, with digital switches having four signal lines 10a to 10d, 16 addresses, i.e., 16 distance differences ΔDn (n=integer between 1 and 16) can be stored.

Next, operation of the fourth embodiment will be described with reference to FIGS. 11(a)–11(c), which are diagrams illustrating the relationship between a division point and a measurement zone. Assume that the mode switch MS is off and the input signals are IP2="H" and IP1="L" (one-side setting).

First, as in the third embodiment described above, the operator of the distance measurement device places an object at a location spaced from the distance measurement device by a desired distance and presses the switch 103a. The distance measurement means 1 performs a distance measurement operation to measure the distance to the object, and stores distance data DPA5 (for example, 2.23 m) in the storage means 75. Once the distance data is stored, the display means 76 displays for a predetermined time period that the distance data has been stored in the storage means. As shown in FIG. 11(a), the point of this distance data is a specific point and becomes one division point PA5.

Next, the operator places an object at a location spaced from the distance measurement device by another desired distance and presses the switch 103b. The distance measurement means 1 performs a distance measurement operation to measure the distance to the object. The distance data of the second specific point obtained by pressing the switch 103b is set to DPBn (n is an arbitrary integer and, for example, is 5). The judgment means 75 calculates the difference (absolute value) between the distance data DPA5 of the specific point and the distance data DPB5 of the other specific point, and stores the calculated distance value in second storage means 100. The storage location of the second storage means 100 is an address that is set by the address setting means 101. If the address set means 101 is at the first address, it will be stored in the first address as a distance difference ΔD1. If the distance data DPB5 is 1.78 m, the distance difference ΔD1 will become 0.45 m (2.23 m−1.78 m).

Since input signals are IP2="H" and IP1="L," the judgment means 72 sets the other division point Pa5 to a distance point (2.68 m) obtained by adding the distance difference ΔD1 (0.45 m) to the distance value DPA5 (2.23 m) of the first specific point PA5, as shown in FIG. 5(a). Therefore, for the measurement zones that are divided at the division points PA5 and Pa5, Z1 becomes 0.5 m to 2.23 m, Z2 becomes 2.23 m to 2.68 m, and Z3 becomes 2.68 m to 3.7 m.

This embodiment is now described in connection with the belt conveyor example of FIG. 13. Assuming that the distance to the right end of the belt conveyor BC1 is DPA5, then the distance to the right end of the belt conveyor BC2 is Dpa5 and the distance difference ΔD1 is the width W of the belt conveyor BC2. If the width W has been stored once, a measurement zone will be able to be automatically set by pressing the switch 83a to measure the distance to the right end of the belt conveyor BC1, even if the distance between the distance measurement device and the belt conveyor is changed. Since the distance difference ΔD1 is a difference between two actually measured distances, an accurate distance can be set.

Also, by changing the address setting means 101 to the nth address (n=integer between 2 and 16), and by changing the distance between the distance measurement device of the present invention and an object and pressing the switch 103b, the distance value ΔDn of the difference between the distance data of the specific point and the distance data of the other specific point can be set in the manner described above.

Figure 11A:
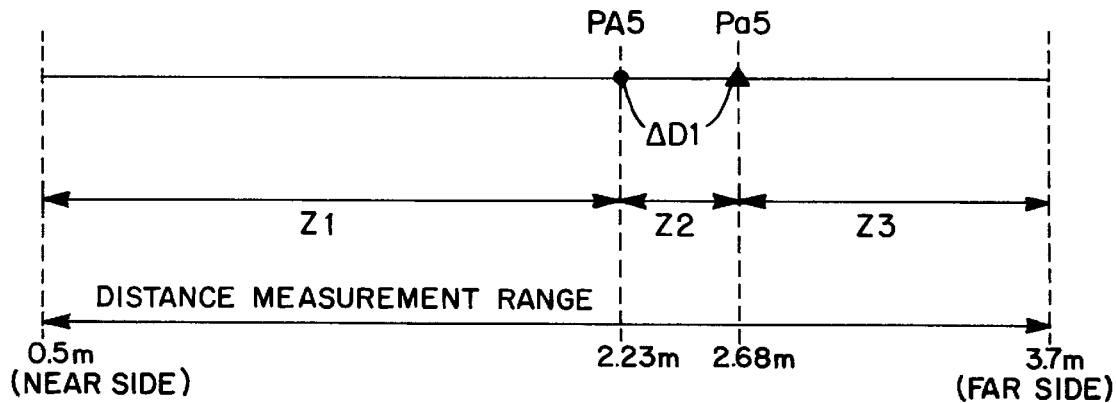
FIGS. 11($a$)–11($c$) are diagrams used to explain operation of the fourth embodiment of the present invention.
Figure 11B:
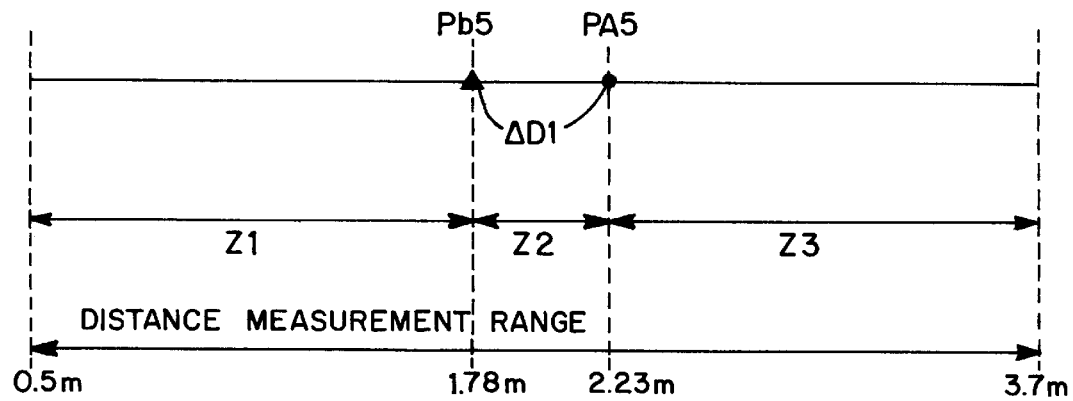

Next, if input signals are IP2="L" and IP1="H," the judgment means 72 sets the second division point Pb5 to a distance point (1.78 m) obtained by subtracting the distance difference ΔD1 (0.45 m) from the distance value DPA5 (2.23 m) of the specific point PA5, as shown in FIG. 11(b).

Figure 11C:
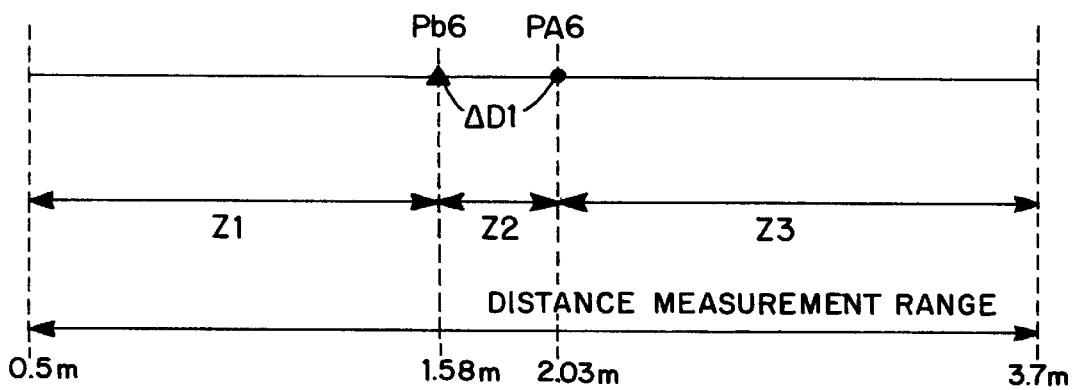

FIG. 11(c) illustrates the case where the distance measurement device has been moved from the location of FIG. 11(b) toward an object and the operator has pressed the switch 103a. If the setting of the address setting means 101 has not been changed, i.e., the distance difference ΔD1 has not been changed, only the distance of the specific distance point will be changed without changing the width (0.45 m) of the measurement zone Z2. That is, if the distance of the specific point PA5 (division point on the far side) becomes 2.03 m (point of PA6), then the distance of the division point Pb6 on the near side will become 1.58 m (2.03 m−0.45 m). Note that if in FIG. 11(c) the address setting means 101 is changed to the second address and the distance difference ΔD2 stored in the second address is 0.62 m, then the other division point Pb6 will become 1.41 m (2.03 m−0.62 m).

Figure 12A:
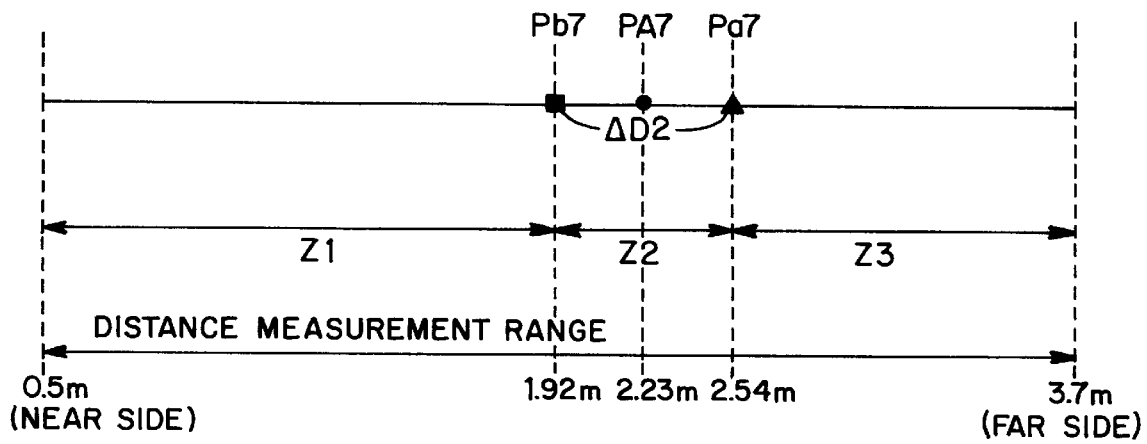
FIGS. 12($a$)–12($b$) are diagrams used to explain the fourth embodiment of the present invention.
Figure 12B:
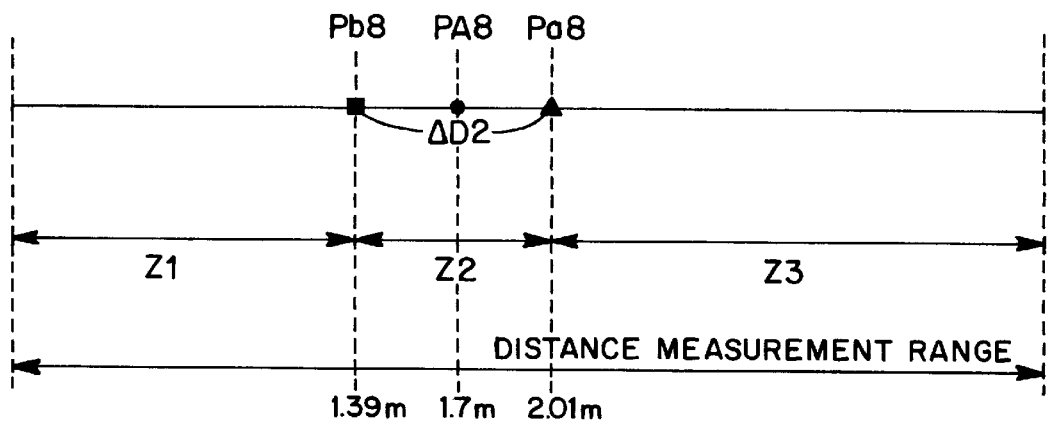

Also, if input signals are IP2="H" and IP1="H," the address setting means 101 has been set to the second address, and a predetermined percentage has been set to 0.5, then the judgment means 72 sets one division point to a distance point Pa7 (2.54 m) obtained by adding 50% (0.31 m) of the distance difference ΔD2 (0.62 m) to the distance value DPA7 (2.23 m) of the specific point PA7, as shown in FIG. 12(a). Also, the judgment means 72 sets the other division point Pb7 to a distance point (1.92 m) obtained by subtracting 50% (0.31 m) of the distance difference ΔD2 (0.62 m) from the distance value DPA7 (2.23 m) of the specific point PA7.

FIG. 11(b) illustrates the case where the distance measurement device has been moved from the location of FIG. 11(a) toward an object and the operator has pressed the switch 103a. If the setting of the address set means 10 has not been changed, i.e., the distance difference ΔD2 has not been changed, only the distance of the specific point will be able to be changed without changing the width (0.62 m) of the measurement zone Z2. That is, if the distance of the specific point PA8 becomes 1.7 m, then the distance of the division point Pa8 on the far side will become 2.01 m (1.7 m+0.31 m), and the distance of the division point Pb8 on the near side will become 1.39 m (1.7 m−0.31 m).

While in the above case the same distance value has been set on the far side and near side of a specific point, input terminals for switching may be provided in distance measurement mans and judgment means to change a rate. For example, with combinations of the voltages of the input terminals, 30 percent (18 cm) of a distance value (for example, 60 cm) may be set on the near side of a specific point and 70 percent (42 cm) may be set on the far side.

The operation of the case where the operator has pressed the start switch SS or the operation of the case where the mode switch MS is on is identical with that of the third embodiment.

While in the above-described first and second embodiments the distance measurement range LNF has been divided into plural measurement zones based on the value of the specific distance point PA, the present invention is not limited to this. The division width may be changed according to any predetermined function based, for example, on a relationship such as a fractional function or a logarithmic function. Various modifications, such as a modification in which the division width is made fine at a short distance and rough at a long distance, are possible.

Further, although in the above embodiments it has been described that, for simplicity, two division points are set in accordance with a specific distance point and a range of measurement is divided into three measurement zones, the present invention is not limited to this. Increasing the number of measurement zones is also possible, for example, by setting four division points about two specific distance points.

Further, although in the above first and second embodiments the first and second division point setting means 3 and 4 have been made so that any of 16 different values for each of the three division points may be set with signal lines of four bits, the number of bits may be increased or decreased.

In accordance with the present invention, for example, in an object detecting device for detecting articles travelling on belt conveyors arranged in parallel, when the distance of installation between the object detecting device and the belt conveyor is changed, only the specific distance point must be reset by measuring the distance between the object detecting device and one end or center of the belt conveyor. Therefore, it becomes unnecessary to perform the operations required in applicants' earlier device wherein the distance to each of a plurality of belt conveyors or one belt conveyor is measured, the width of the belt conveyor is added to the measured value to calculate two distances, and the first division point setting means and the second division point setting means are both reset.

Thus, there can be provided according to the construction of the present invention a distance measurement device that, in a case where the width of a measurement zone desired to be detected has been fixed, can easily set the measurement zones even when the location of the object detecting device is changed.

While it has been described in the third and fourth embodiments that, for simplicity, an area is divided at two distance division points into three measurement zones, the invention is not limited to this. (k+1) measurement zones (where k is an integer of 3 or more) can also be set with k division points. Also, while it has been described in the third and fourth embodiments that the set operation of the division points will be started if the switch 3a or 3b (or 103a, 103b) is pressed, additional lock means may be provided since the set operation of the division points is not one which is often performed. Various modifications, such as a modification where a lock switch is provided such that the setting operation of division points is performed only when the lock switch is on, and previously set division points would not disappear even if the switch 3a or 3b (or 103a, 103b) were pressed by mistake or a modification where the switches 3a or 3b (or 103a, 103b) do not function unless pressed for a predetermined period of time, are also possible.

Further, only one switch may be provided for the first setting means and division points to be set may be changed in sequence each time the switch is pressed.

Further, in the third and fourth embodiments, in order to inform the operator that distance data has been stored in storage means after the completion of the distance measurement, the display means 76 may be lit with a pattern different from the pattern displayed during normal distance measurement operations.

According to the present invention, in a case where a measurement zone having a fixed width exists among a plurality of measurement zones that are desired to be detected and the distance to that measurement zone is often changed, since the distance setting of division points can be performed by merely placing an object at an easily measurable point and pressing a switch, the division points can be set with a fewer number of settings. Also, since a timer means is provided, the setting of the division point on the far side is possible even when only one operator is present. Moreover, since a plurality of distance differences each representing a difference between two actually measured points can be stored, measurement zones can be set accurately, and the device may be used in applications requiring high precision.

We claim:

1. A device for determining a distance range of an object comprising: a switch for generating a start signal; distance measurement means for measuring a distance to an object; means for adjustable setting a specific distance point in response to the start signal; a memory for storing data representing the specific distance point; setting means for adjustable setting at least one predetermined division point on at least one of the near side and the far side of the specific distance point such that the specific distance point and the at least one predetermined division point define a plurality of measurement zones within an effective measurement range of the distance measurement means; and judgment means for judging which of the plurality of measurement zones a distance measurement result of the distance measurement means belongs to.

2. A device for determining a distance range of an object according to claim 1; further comprising means for adding the at least one predetermined division point on the far side to the specific distance point and subtracting the at least one predetermined division point on the near side from the specific distance point to set the plurality of measurement zones.

3. A device for determining a distance range of an object comprising: at least one switch for generating a start signal; distance measurement means for measuring a distance to an object in response to the start signal; means for adjustable dividing an effective measurement range of the distance measurement means into a plurality of measurement zones, including first storage means for storing distance measurement data output by the distance measurement means during a specific distance point setting operation and second storage means for storing a difference between two distance measurement results measured in response to the start signal by the distance measurement means such that a plurality of measurement zones are defined by the data stored in the first storage means and the data stored in the second storage means; and judgment means for judging which of the plurality of measurement zones a measurement result of the distance measurement means belongs to.

4. A device for determining a distance range of an object according to claim 3; further comprising means for adding the difference to the distance measurement data and subtracting the difference from the distance measurement data to determine the plurality of measurement zones.

5. A device for determining a distance range of an object comprising: distance measurement means for measuring a distance to an object; judgment means for judging an output of the distance measurement means; means for adjustably setting a specific distance point within an effective measurement range of the distance measurement means; and division point setting means for adjustably setting at least one division point on the near side of the specific distance point and at least one division point on the far side of the first distance point such that a measurement range of the distance measurement means is divided into a plurality of measurement zones each having boundaries defined by the specific distance point and the respective division points, and the judgment means determines which of the plurality of measurement zones a distance measurement result obtained by the distance measurement means belongs to.

6. A device for determining a distance range of an object according to claim 5; wherein the division point setting means includes means for adjustably setting the respective division points at predetermined equal distances on the near and far sides of the specific distance point, respectively.

7. A device for determining a distance range of an object according to claim 5; wherein the division point setting means includes means for adjustably setting the respective division points at predetermined distances on each of the near side and the far side of the specific distance point.

8. A device for determining a distance range of an object according to claim 5; wherein the judgment means includes computation means for converting values of the specific distance point, the respective division points and a distance measurement result obtained by the distance measurement means into comparable values.

9. A device for determining a distance range of an object comprising: distance measurement means for measuring a distance to an object; judgment means for judging an output of the distance measurement means; means for adjustable setting a specific distance point within a measurement range of the distance measurement means; division point setting means for adjustably setting at least one predetermined division point on at least one of the near and the far side of the specific distance point; and storage means for storing distance data corresponding to the specific distance point and the at least one predetermined division point such that a plurality of measurement zones are defined by the at least one predetermined division point, and the judgment means determines which of the plurality of measurement zones a measurement result of the distance measurement means belongs to.

10. A device for determining a distance range of an object comprising: a switch for generating a start signal; distance measurement means for measuring a distance to an object in response to the start signal; storage means for storing distance measurement data output by the distance measurement means; setting means for adjustably setting at least one predetermined division point on at least one of the near side and the far side of the distance measurement data stored in the storage means such that the distance measurement data and the at least one predetermined division point define a plurality of measurement zones within a measurement range of the distance measurement means; judgment means for judging which of the plurality of measurement zones a distance measurement result of the distance measurement means belongs to; and timer means for generating a predetermined delay time between a time that the switch is activated and a time that the start signal is generated.

11. A distance measurement device comprising: at least one switch for generating a start signal; distance measurement means for measuring a distance to an object in response to the start signal; first storage means for storing distance measurement data output by the distance measurement means; second storage means for storing a difference between two distance measurement results measured in response to the start signal by the distance measurement means such that a plurality of measurement zones are defined by the data stored in the first storage means and the data stored in the second storage means; judgment means for judging which of the plurality of measurement zones a measurement result of the distance measurement means belongs to; and timer means for generating a predetermined delay time between a time that the switch is activated and a time that the start signal is generated.

12. A distance measurement device comprising: distance measurement means for measuring a distance to an object; judgment means for judging an output of the distance measurement means; means for setting a specific distance point within a measurement range of the distance measurement means; division point setting means for setting at least one division point on the near side of the specific distance point and at least one division point on the far side of the first distance point such that a measurement range of the distance measurement means is divided into a plurality of measurement zones each having boundaries defined by the specific distance point and the respective division points, and the judgment means determines which of the plurality of measurement zones a distance measurement result obtained by the distance measurement means belongs to; wherein the division point setting means includes means for setting the respective division points in accordance with a predetermined percentage of the specific distance point, on the near and far sides of the specific distance point, respectively.

13. A distance measurement device comprising: distance measurement means for measuring a distance to an object; judgment means for judging an output of the distance measurement means; means for setting a specific distance point within a measurement range of the distance measurement means; division point setting means for setting at least one division point on the near side of the specific distance point and at least one division point on the far side of the first distance point such that a measurement range of the distance measurement means is divided into a plurality of measurement zones each having boundaries defined by the specific distance point and the respective division points, and the judgment means determines which of the plurality of measurement zones a distance measurement result obtained by the distance measurement means belongs to; wherein the division point setting means includes means for setting the respective division points in accordance with a predetermined percentage of a the specific distance point on one of the near side or far side of the specific distance point.

14. A device for determining a distance range of an object, comprising: distance measurement means for measuring a distance to an object; specific distance point setting means for adjustably setting a specific distance point within an effective distance measurement range of the distance measurement means; division point setting means for adjustably setting at least one division point corresponding to the specific distance point such that the division point defines a plurality of measurement zones within the effective measurement range of the distance measurement means; and judgment means for judging which of the plurality of measurement zones a distance measurement result of the distance measurement means belongs to.

15. A device for determining the distance range of an object according to claim 14; wherein the specific distance point setting means includes means for adjustably setting the specific distance point in accordance with a distance measurement result obtained during a specific distance point setting operation conducted before a distance measurement operation.

16. A device for determining the distance range of an object according to claim 14; wherein the division point setting means includes means for adjustably setting the at least one division point at a predetermined distance on one of the near side or far side of the specific distance point.

17. A device for determining the distance range of an object according to claim 14; wherein the at least one division point is set in accordance with the specific distance point and a difference between two distance measurement results measured by the distance measurement means during a specific distance point setting operation and a division point setting operation.

18. A device for determining the distance range of an object according to claim 14; wherein the effective measurement range of the distance measurement means is divided into a plurality of measurement zones each having boundaries defined by the specific distance point and the at least one division point.

19. A device for determining the distance range of an object according to claim 14; further comprising a switch for generating a start signal to commence the specific distance point setting operation, and timer means for generating a predetermined time delay time between a time that the switch is activated and a time that the start signal is generated.

20. A device for determining the distance range of an object according to claim 14; wherein the division point setting means includes means for setting the respective division points at predetermined equal distances on the near and far sides of the specific distance point, respectively.

* * * * *